United States Patent [19]

Belfiore

[11] 4,249,294
[45] Feb. 10, 1981

[54] OPTICAL PULLEY ALIGNMENT TOOL

[76] Inventor: Flavio Belfiore, 36 Maybury Ct., Staten Island, N.Y. 10306

[21] Appl. No.: 52,803

[22] Filed: Jun. 28, 1979

[51] Int. Cl.³ .............................................. B25B 27/14
[52] U.S. Cl. ..................................... 29/271; 33/181 R
[58] Field of Search ............... 29/271; 33/181 R, 182, 33/412, 286, 181 AT

[56] References Cited

U.S. PATENT DOCUMENTS

| 685,455 | 10/1901 | Kinkead | 33/286 |
| 2,256,527 | 9/1941 | Ring | 33/181 |
| 3,901,604 | 8/1975 | Butler | 33/286 |

FOREIGN PATENT DOCUMENTS 875730 5/1953 Fed. Rep. of Germany ........ 33/181 R

Primary Examiner—James L. Jones, Jr.
Attorney, Agent, or Firm—Hopgood, Calimafde, Kalil, Blaustein & Lieberman

[57] ABSTRACT

An optical alignment device for aligning the pulleys of a belt drive system in three planes. The device includes first and second members releasably attachable to each pulley. The first member mounts a target device having horizontal and vertical alignment markings corresponding to the centerline of the pulley. The second member mounts a viewing device having horizontal and vertical alignment markings corresponding to the centerline of the other pulley. The target is seen in the viewing device, when the horizontal and vertical markings of the viewing device and the target are superimposed, the pulleys will be in alignment in the horizontal, vertical and angular planes. A projector may be used in place of the viewing device to project a beam of light on the target in a second preferred embodiment of the invention.

5 Claims, 5 Drawing Figures

OPTICAL PULLEY ALIGNMENT TOOL

BACKGROUND AND SUMMARY OF THE INVENTION

This invention relates generally to a device for aligning the pulleys of a belt drive system. In the past, these pulleys have been aligned by the use of a cord line or a straight edge to indicate center alignment. Measurements must be taken accurately at four points on the pulleys; at the top, bottom and each side of the pulleys. Angular alignment requires the use of specialized gauges and instruments. These methods were less than completely satisfactory; since they are time consuming, are prone to inaccuracy, and unreliable because an adjustment of one alignment may cause the other alignments to change. Furthermore, these alignment procedures are relatively costly and require specially trained people.

In my U.S. patent application Ser. No. 31,327 filed Apr. 18, 1979, I disclose an alignment tool for aligning belt drive pulleys along their vertical and horizontal centerlines as well as providing angular alignment. This device utilizes mechanical linkages and is relatively inexpensive, quick, and does not require the use of specially trained operators. In this application I disclose another device utilizing optical means to align the pulleys of a belt drive system.

Generally speaking, in accordance with the invention, a device for aligning the pulleys of a belt drive is provided. The device includes first and second members releasably attachable to each of the pulleys. A target is attached to one member, the target includes horizontal and vertical alignment markings. An optical viewer is attached to the other member. The optical viewer also includes horizontal and vertical alignment markings. When both pulleys are horizontally, vertically and angularly aligned, the markings on the viewer and the target will be seen superimposed.

Accordingly, it is an object of this invention to provide an optical device for aligning the pulleys of the belt drive system.

It is another object of this invention to provide an alignment device for belt drive pulleys that is simple and relatively quick to use.

It is another object of this invention to provide an alignment device for belt drive pulleys that may be used by relatively unskilled operators.

It is another object of this invention to provide an alignment device for belt drive pulleys that is accurate.

Still other objects of this invention will become apparent upon a reading of the detailed specification to follow.

BRIEF DESCRIPTION OF THE DRAWINGS

In order to better understand the invention, reference is made to the following drawings, taken in connection with the detailed specification to follow.

DESCRIPTION OF THE PREFERRED EMBODIMENT

Figure 1:
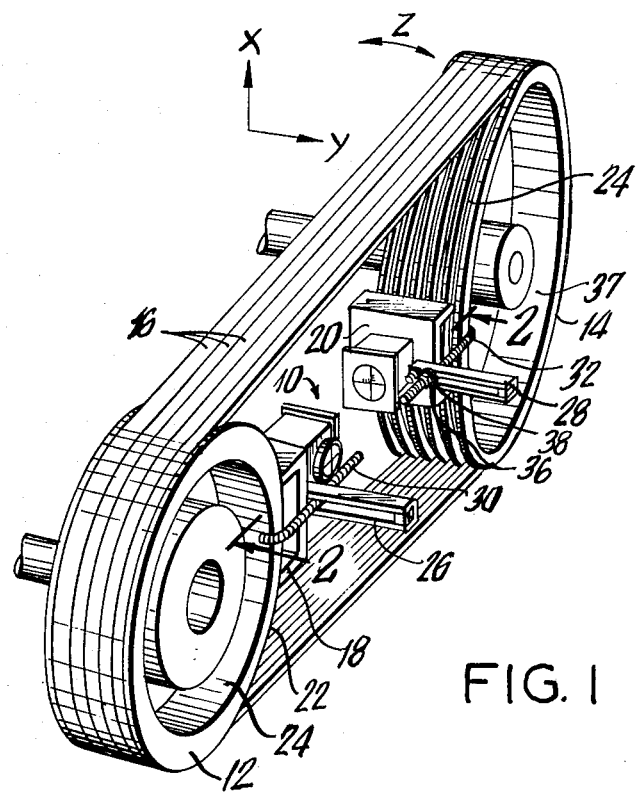
FIG. 1 is a perspective view of a pair of multiple belt pulleys which are to be aligned with the use of the instant invention which is shown attached thereto.
Figure 2:
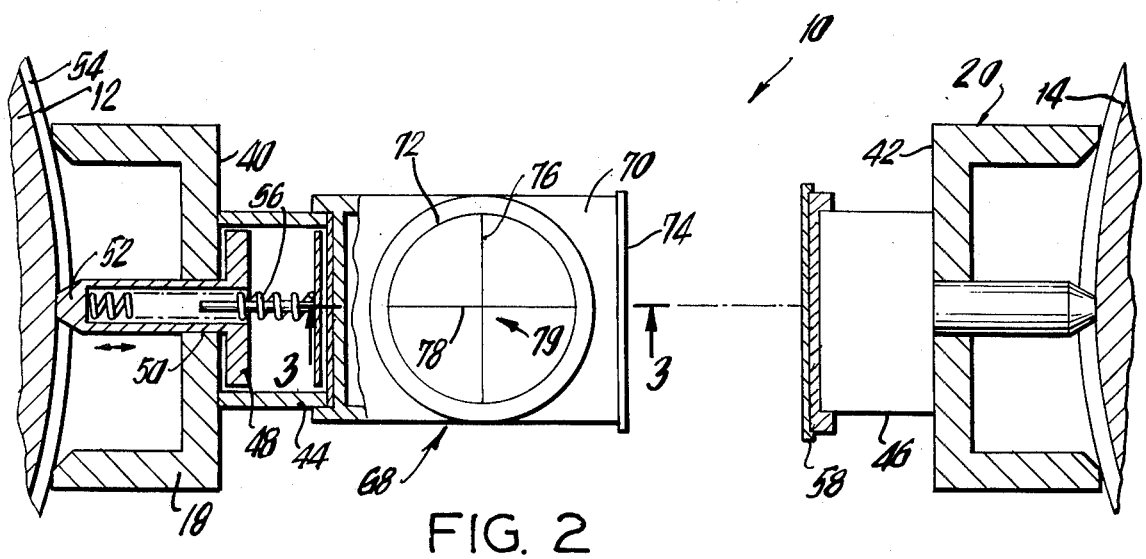
FIG. 2 is a view taken along line 2—2 of FIG. 1.
Figure 2A:
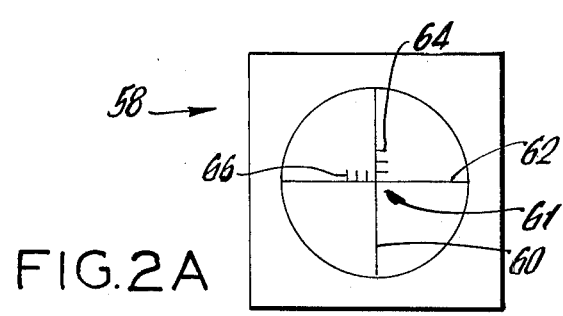
Figure 3:
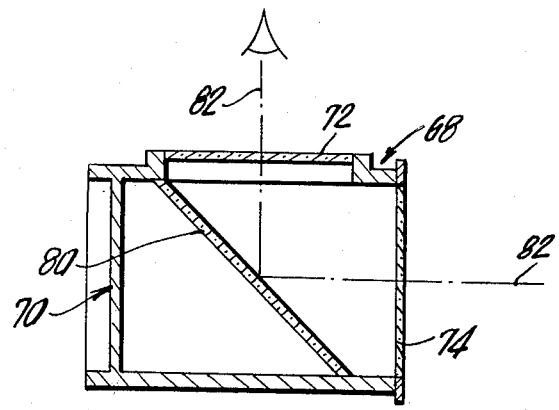
FIG. 3 is a view taken along line 3—3 of FIG. 2.
Figure 4:
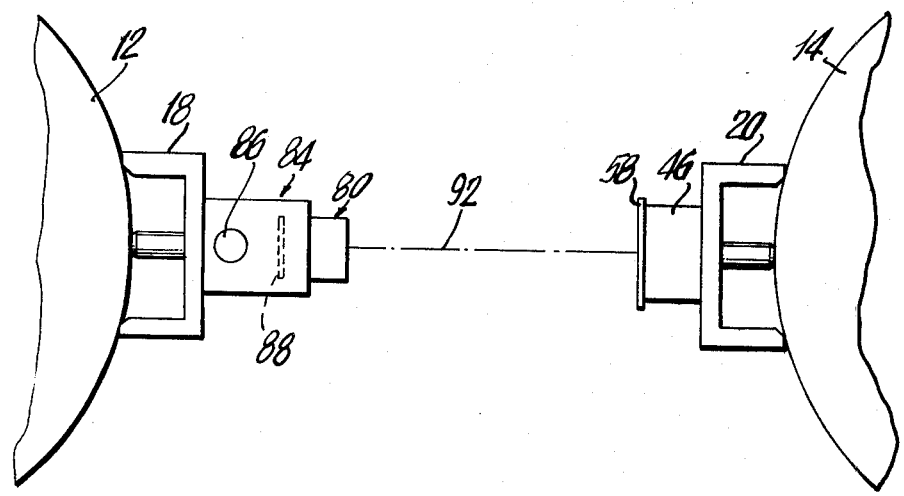
FIG. 4 illustrates another preferred embodiment of the instant invention.

The drawings illustrate an alignment tool 10 for aligning a pair of multiple groove pulleys 12, 14 to prevent excessive wear of the "V" belts 16 carried thereby. Generally "U" shaped members 18, 20 are secured to the faces 22, 24 of pulleys 12, 14, respectively. Members 18, 20 include slotted bars 26, 28 which carry "L" shaped threaded rods 30, 32 which engage the inner faces 34, 37 of pulleys 12, 14, respectively. Nuts 36 and washers 38 permit adjustment of rods 30, 32, both along the slot of bars 26, 28 and their longitudinal axes to adjust for different sizes of pulleys. Thus, when properly adjusted, members 18, 20 and the outer walls 40, 42 thereof will be normal to the centerline between pulleys 12, 14.

Extending forwardly from faces 40, 42 of members 18, 20 are necks 44, 46. Each neck 44, 46 includes a slidable "T" shaped rod 48 extending through an opening 50 in member 18. Rod 48 includes a tapered nose 52 for engagement with a groove 54 of pulleys 12, 14. A spring 56 serves to bias nose 52 of rod 48 into contact with groove 54.

Neck 46 on member 20 mounts a target 58 which carries thereon a vertical line 60 and a horizontal line 62 forming a cross-hair 61. Vertical line 60 will be parallel to the vertical centerline of pulley 14 to which member 20 is attached and horizontal line 62 will be parallel to the horizontal centerline of pulley 14. Calibration marks 64, 66 are provided along lines 60, 62, respectively.

Mounted to neck 44 is a viewing device 68 which includes a housing 70 and first and second transparent disks 72, 74 aligned perpendicularly with respect to each other. Each disk 72, 74 has inscribed thereon a vertical line 76 and a horizontal line 78 forming a crosshair 79. A mirror 80 is located at a 45° angle with respect to disks 72, 74 and thereby with face 40 of member 18. Thus, a person sighting through disk 72 sees along viewline 82 which is bent at a 90° angle at mirror 80 and then passes through disk 74. This arrangement permits a viewer to look in from right angles with respect to the centerline of pulleys 12, 14. When the crosshairs 79 on each disk 72, 74 are superimposed on one another, the viewer will be looking along the centerline of pulleys 12, 14. Viewing device 68 may include lenses to provide a magnified view of target 58.

In order to align the centerline of pulleys 12, 14 in both the "X" "Y" and angular "Z" planes, it is merely necessary to adjust the pulleys so that the two pairs of crosshairs 79 on disks 72, 74 are seen aligned with crosshair 61 on target 58. Thus, when the three crosshairs are seen aligned in viewing device 58, the pulleys will be in vertical, horizontal and angular alignment. Vertical or horizontal misalignment is indicated by vertical or horizontal displacement of the crosshairs, while angular misalignment is indicated by the crosshair 61 of target 58 being disposed at an angle to the crosshairs 79 of disks 72, 74. The calibration marks 64, 66 on target 58 are used to determine the amount of adjustment needed to align the pulleys.

In a second preferred embodiment of this invention, the viewing device 68 is replaced by a projector 84 on member 18. All other elements of the alignment tool remain the same, with like reference numerals being used to indicate like structure. Projector 84 includes a light source 86, a transparent member 88 having vertical and horizontal alignment markings such as a crosshair which is projected on target 58 by means of lens 90. Lens 90 includes means for focusing the image on target 58 and it may also include means for adjusting the size of the image thrown, i.e., a "zoom" type lens. Projector 84 projects a beam of light along centerline 92 which projects the horizontal and vertical markings of member 88 on target 58. The superimposition of the vertical and horizontal projected markings on the vertical and horizontal markings of target 58 indicate horizontal and vertical alignment of the centerlines of pulleys 12, 14. As above, angular misalignment of pulleys 12, 14 is indicated by angular misalignment of the projected image on target 58.

Thus, it is seen that the instant invention provides a means for alignment of the pulleys of a multiple belt drive unit in a simple and straightforward manner without the need for special training or tools. The alignment procedure is fast, simple, and does not require the belts to be disengaged from the pulleys.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. An optical alignment device for aligning pulleys comprising:
   (a) first and second members releasably attachable to each of said pulleys;
   (b) target means mounted to one of said members, said target means including a vertical and horizontal alignment indicia; said vertical and horizontal indicia being parallel to the vertical and horizontal centerline of said pulley;
   (c) optical viewing means, said optical viewing means mounted to the other of said members and including vertical and horizontal alignment indicia parallel to the vertical and horizontal centerline of said other pulley; and
   (d) said target means being viewable in said viewing means to permit alignment of said pulleys when said alignment indicia on said viewing means are superimposed on said alignment indicia on said target means.

2. The alignment tool as claimed in claim 1 wherein said viewing means comprise first and second transparent means having vertical and horizontal indicia thereon.

3. The alignment tool as claimed in claim 2 wherein said first and second transparent means are disposed perpendicularly with respect to one another, and having a mirror disposed at a 45° angle between said first and second transparent means to permit viewing through both said first and second transparent means.

4. The alignment tool as claimed in claim 1 wherein said vertical and horizontal alignment indicia comprise perpendicular crosshairs.

5. An optical alignment device for aligning first and second pulleys comprising:
   (a) first and second members releasably attached to said first and second pulleys;
   (b) target means disposed on said first member and having vertical and horizontal alignment indicia thereon;
   (c) projector means, said projector means disposed on said second member, said projector means projecting an image including indicia indicating the location of the horizontal and vertical centerline of the said second pulley on said target means; and
   (d) said projector means and said target means indicating alignment of said pulleys when said projected image is in alignment with the horizontal and vertical indicia of said target means.

* * * * *